United States Patent [19]

Pfalzgraf

[11] Patent Number: 5,030,047
[45] Date of Patent: Jul. 9, 1991

[54] MOUNTING DEVICE FOR CONICAL SHANK

[75] Inventor: Emile Pfalzgraf, Bouxwiller, France

[73] Assignee: E.P.B. Emile Pfalzgraf, Societe Anonyme, Bouxwiller, France

[21] Appl. No.: 436,748

[22] Filed: Nov. 15, 1989

[30] Foreign Application Priority Data

Nov. 15, 1988 [FR] France ............................... 88 15077
Jan. 20, 1989 [FR] France ............................... 89 00868

[51] Int. Cl.⁵ ............................................... B23C 9/00
[52] U.S. Cl. ................................................... 409/234
[58] Field of Search .................. 409/232, 233, 234; 279/1 T, 102, 15 G, 28, 1 DA, 1 DC; 408/238, 239 R, 239 A; 82/1

[56] References Cited

U.S. PATENT DOCUMENTS

| 3,895,881 | 7/1975 | Langlois | 408/239 X |
|---|---|---|---|
| 4,122,755 | 10/1978 | Johnson et al. | 408/239 A |
| 4,238,167 | 12/1980 | Brugger et al. | 409/232 |
| 4,548,532 | 10/1985 | Watanabe et al. | 409/233 |
| 4,660,840 | 4/1987 | Mizoguchi | 279/1 N |
| 4,784,536 | 11/1988 | Pfalzgraf | 408/239 A |
| 4,822,220 | 4/1989 | Danielsson et al. | 409/233 |
| 4,840,520 | 6/1989 | Pfalzgraf | 409/232 |
| 4,886,402 | 12/1989 | Pfalzgraf | 409/234 |

FOREIGN PATENT DOCUMENTS

| 0164582 | 12/1985 | European Pat. Off. . |
| 0185842 | 7/1986 | European Pat. Off. . |
| 2102051 | 3/1972 | Fed. Rep. of Germany . |
| 3436733 | 4/1986 | Fed. Rep. of Germany . |
| 3521799 | 1/1987 | Fed. Rep. of Germany . |
| 3541236 | 5/1987 | Fed. Rep. of Germany . |
| 87014998 | 8/1987 | Fed. Rep. of Germany . |
| 3632045 | 11/1987 | Fed. Rep. of Germany . |
| 2614224 | 10/1988 | France . |
| 482766 | 4/1938 | United Kingdom . |

Primary Examiner—William Briggs
Attorney, Agent, or Firm—Young & Thompson

[57] ABSTRACT

The present invention concerns a mounting device with conical shank, particularly a 7/24ths cone, for cone-to-surface application for attachments, tool holders and tools, essentially constituted by a cone (1) for introduction in the spindle (2), by a front part (3) centered in the cone (1) and provided with a flange (4) for application against the face of the spindle (2), by a knob (5) for assembly of the cone (1) in the front part (3) and by an elastic pressure unit (6) of the cone (1) in the spindle (2) in locking position, mounted in compression between the said cone (1) and the front part (3), characterized in that it is provided with an elastically deformable means (7) applying the front part (3) forcibly in the cone (1), in locking position.

30 Claims, 7 Drawing Sheets

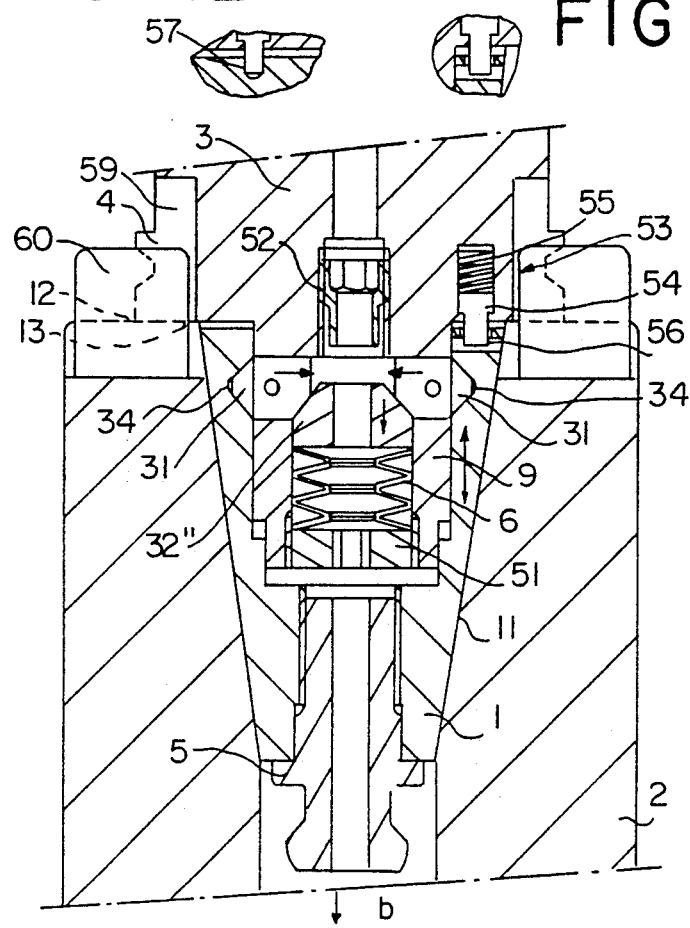
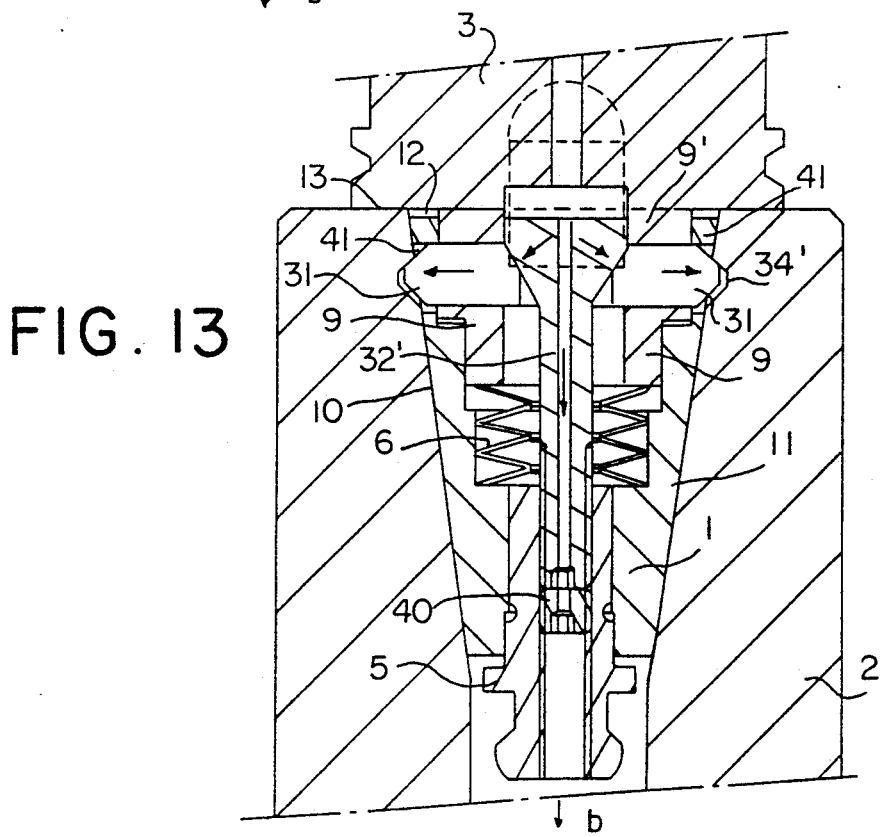
FIG. 12A  FIG. 12B  FIG. 12  FIG. 13

MOUNTING DEVICE FOR CONICAL SHANK

The present invention concerns the field of machine tool accessories, with numeric control, machining centers, flexible cells and manufacturing systems, and has for an object a mounting device with conical shank, particularly a 7/24ths cone, for cone-to-surface use for attachments, tool carriers and tools.

At present, the fastening or mounting of a tool attachment or of toolings in the spindles of milling, boring, numeric control machines, of machining centers or flexible cells or manufacturing systems, is generally achieved by means of conical shanks whose most current taper is 7/24ths. These mountings and fastenings were satisfactory up to now and still are for some operations.

The accession of machining centers with 7/24th taper, most of the time exhibiting a truncated back and a special flange for automatic changing of the tools, has led to modification of the conventional 7/24ths cone with a simple flange and back thread for fastening with threaded bolt.

The majority of machine spindles now made are provided for mounting of tools having a 7/24ths cone and flanges corresponding to the usual standards, there still being some machines with flanges quite specific to certain manufacturers.

The known type of fastening, described above, is still satisfactory for some applications, but because of the increase in power and considerable performance of machines and tooling centers, as well as very considerable developments made in inserts and cutting tools, fastening of the cones in the spindles is no longer suited to the progress made by the machines and the performances of tools and thus constitutes a considerable handicap, the power developed by the machines and the resulting forces able to be absorbed by the tools not being transmissible at the level of the cone.

Specifically, the critical point and the weakness of present fastenings are most often at the spindle output, which is a weakening point for all toolholders or tools, these having to meet a specific diameter of the tool, which is the large diameter of the end of the cone connected by a cylindrical portion of slight length to the flange. The same problem also arises, but in a less crucial way, for fastening tools with a 7/24th cone to lathes.

Moreover, it has been proposed to effect fastening of the tools by means of a cylindrical shank with application against the front surface of the spindle. This embodiment certainly makes it possible to solve the problem of perfect contact between the surfaces but requires a modification of the spindles of the machines. In addition, the weight of the tool, significant in certain cases, risks modifying its alignment relative to the axis of the spindle and the positioning of the tool changer must be carried out in extremely close tolerances in all directions, to permit a perfect alignment of the axis of the spindle and the toolholders.

It has also been proposed, in the case were high performance must be achieved, to obtain a simultaneous application of the cone and the surface of the spindle, to make single-piece standard cones by means of dimensions specific to each spindle. However, such an embodiment involves extremely high prices and requires production tolerances that cannot be maintained for series production. In addition, the tools thus obtained are absolutely specific to a given spindle and in no case are interchangeable with the tools intended for other spindles, thus for other machines. This embodiment is therefore valuable only for responding to specific problems.

Moreover, there has also been proposed a mounting device with conical shank, especially with a 7/24ths cone, with cone-to-surface application for attachments, toolholders and tools, which is essentially constituted by a cone for introduction in the spindle, by a front portion centered in the cone and provided with a flange for application against the surface of the spindle, by a knob for assembly of the cone and of the front portion, by an elastic pressure unit of the cone in the spindle in locking position, mounted in compression between the cone and the front portion, and by a means for adjusting the said pressure unit.

This latter device certainly permits significantly improving the performance of fastening attachments but also has the danger, especially in the presence of very great cutting forces, of insufficient locking of the said attachments and a sliding at the level of the cone-to-surface application. Specifically, fixation of the attachments depends on the design of the machines and machining centers, especially as regards the power of the gripping couple of the tightener and of the absence of locking of the tool gripper.

In addition, an efficient use of the cone-to-surface application devices is tributary to the gripper of the machine, which is generally realized by stacks of Belleville washers, which frequently have a slight gripping couple and which are not provided with a mechanical locking device, such that the said cone-to-surface application may not have all the desired advantages.

The present invention has as an object to overcome these disadvantages.

Specifically, it has as an object a mounting device with conical shank, particularly a 7/24ths cone, for cone-to-surface application for attachments, tool carriers and tools, which is essentially constituted by a cone for introduction in the spindle, by a front part centered in the cone and provided with a flange for application against the surface of the spindle, by a knob for assembly of the cone and the front part and by an elastic pressure unit for the cone in the spindle in locking position, mounted in compression between the said cone and the forward portion, characterized in that it is provided with an elastically deformable means applying the front part forcibly in the cone, in locking position.

The invention will be better understood thanks to the following description, which refers to preferred embodiments, given by way of non-limiting example and explained with reference to the accompanying schematic drawings, in which.

Figure 1:
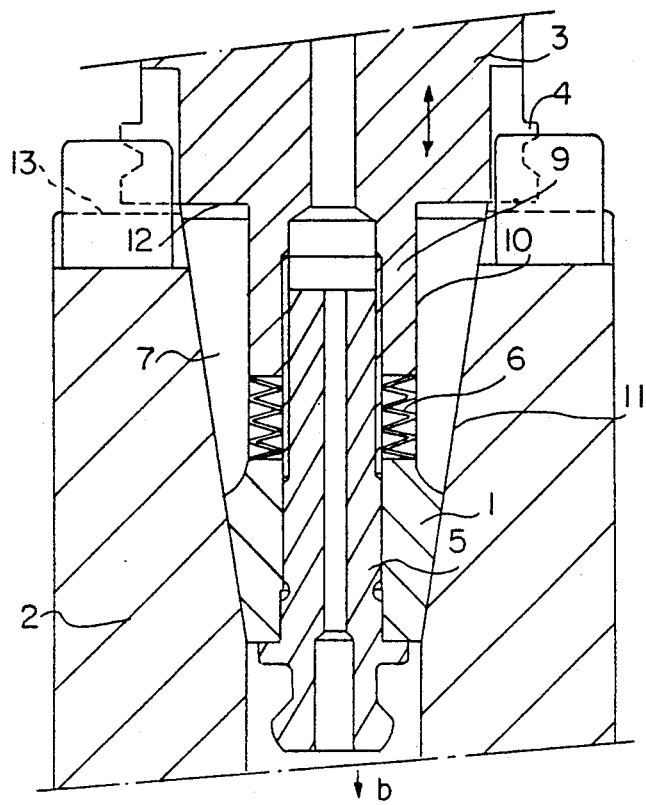
FIG. 1 is a view in side elevation and in section of a device according to the invention.

According to the invention and as shown more particularly by way of example in FIG. 1 of the accompanying drawings, the mounting device with conical shank, especially a 7/24ths cone, for cone-to-surface use for attachments, toolholders and tools, which is essentially constituted by a cone 1 for introduction in the spindle 2, by a front part 3 centered in the cone and provided with a flange 4 for application against the surface of the spindle 2, by a knob 5 for assembly of the cone 1 and the front part 3, and by an elastic pressure unit 6 for the cone 1 in the spindle 2 in locking position, mounted in compression between the said cone and the forward portion 3, is characterized in that it is provided with an elastically deformable means 7 applying the front part 3 forcibly in the cone 1, in locking position.

Figure 2:
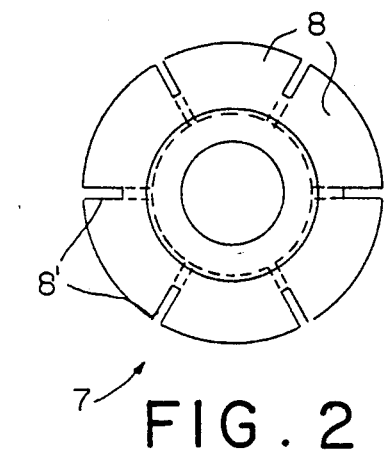
FIG. 2 is a view in rear elevation of the cone of the attachment according to FIG. 1.

The elastically deformable means 7 is advantageously present in the form of conical portions 8 delimited by slits 8' extending longitudinally and equally spaced about the circumference of the cone 1 (FIG. 2). Thus, the means 7 plays the role of a nippers for the shank 9 of the front part 3 in the bore 10 of the cone 1.

So as to prevent any accidental introduction of impurities tending to prevent proper operation of the means 7, the slits 8' are advantageously filled by a compressible, elastically deformable material. Such a filling material may be constituted by a natural or synthetic rubber or also by another synthetic foam.

Upon introduction of the mounting device in the spindle 2 of the machine, the cone 1 is applied in the cone 11 of the spindle 2 and, at the time of the displacement performed under the action of the gripper of the machine on the knob 5 and of the corresponding displacement, in the direction of the arrow b, of the forward part 3, the surface 12 of this latter bears on the surface 13 of the spindle 2 of the machine. Simultaneous with this displacement of the front part 3, there is exerted a force on the cone 1 through the intermediary of the elastic pressure unit 6, formed by a stack of Belleville washers or by another elastic means, such that the cone is applied more strongly against the cone 11 of the spindle 2. This effect of increasing the compression of the cone 1 causes, because of the provision of the slits 8', a deformation of the conical portions 8 delimited between the slits 8' and a gripping of the shank 9 of the front part 3 and the bore 10 of the cone 1. This gripping is similar to that of a nippers on a milling or boring shank.

The two conjugated forces, on the one hand of the knob 5, actuated by the gripper of a machine, on the two application surfaces 12 and 13 and, on the other hand, of the gripping of the cone 1, thanks to the slits 8', on the shank 9 of the part 3, a detachment of the surfaces 12 and 13 is no longer possible.

The retaining force of the device is a function of the gripping couple on the knob 5 by means of the gripper of the machine and of the contact of the cone 1 in the spindle 2 under the action of the elastic pressure unit 6, the locking of the shank 9 of the front part 3 resulting therefrom thus having as a consequence to suppress any adjustment play due to machining tolerances of the shank 9 and of the receiving bore 10.

Figure 3:
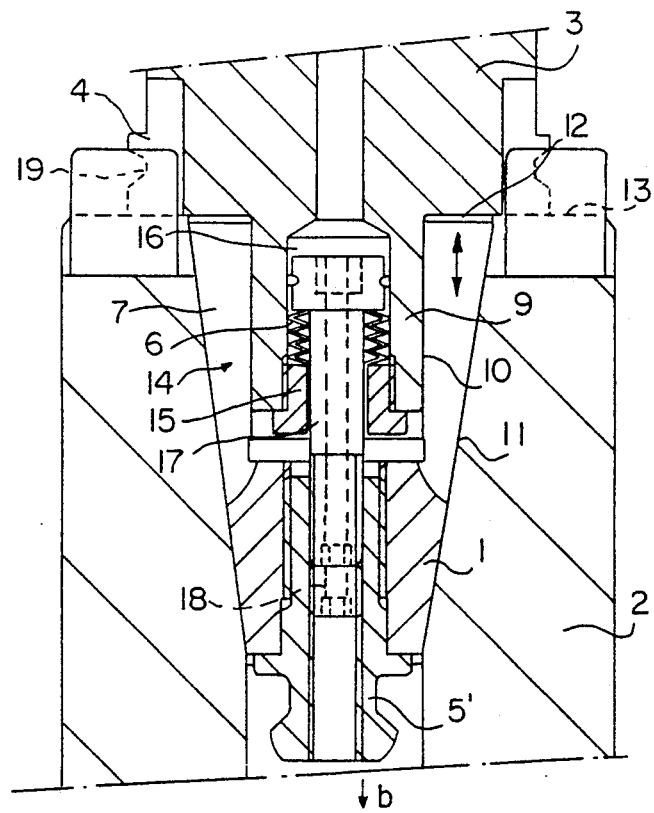
FIG. 3 is a view similar to that of FIG. 1 of another embodiment of the invention.

FIG. 3 of the accompanying drawings shows another embodiment according to the invention, in which the elastic pressure unit 6 of the cone 1 in the spindle 2 in locking position is provided with an adjusting device 14 cooperating with a short knob 5' for assembly of the cone 1 and the front part 3, the said knob 5' being screwed in the cone 1 and locked against its rear face.

The adjusting device 14 is constituted by a screw 15 gripping the elastic unit 6, in a bore 16 of the shank 9 of the front part 3, against the head of a screw 17, provided at its two ends with a hexagonal socket, which cooperates with a tapping of the short knob 5', and by a set screw 18 applied against the said screw 17 and similarly provided with a hexagonal socket, the screw 17 and the set screw 18 being adapted to receive in addition an axial opening for passage of lubrication fluid. The set screw 18 may be replaced by an anti-loosening device provided in the threads of the tapping of the knob 5'.

The screw 17 is introduced in the bore 16 of the shank 9, then the elastic unit 6, in the form of a stack of Belleville washers in this embodiment, is placed in pressure on the said screw 17, against the head of this latter and is blocked by the screw 15. The short knob 5' is then screwed in the cone 1 and blocked against the back face of this latter.

The introduction of the shank 9 of the front part 3 in the bore 10 of the cone 1 is effected by screwing of the screw 17 in the corresponding tapping of the knob 5'. This screwing may be effected by accessing one of the hexagonal sockets of the screw 17 through an opening provided for this purpose in the front part 3 or in the short knob 5'. By this screwing, it is possible simultaneously to adjust the spacing between the front face of the cone 1 and the application face 12 of the front part 3 such that the faces 12 and 13 be applied against one another at the time of introduction of the mounting in the spindle 2. After this adjustment, the screw 17 is locked by means of the set screw 18.

After introduction of the mounting device in the spindle 2 of the machine and mutual contact of the faces 12 and 13, the gripper of the machine exerts a force on the knob 5' in the direction of the arrow b. The cone 1 is then entrained and force-fitted against the wall of the cone 11 and the spindle 2.

As in the embodiment according to FIGS. 1 and 2, the cone 1 may also be provided with an elastically deformable means 7 in the form of conical portions 8 delimited by slits 8' extending longitudinally and equally spaced over the circumference of the cone 1. In such a case, the shank 9 of the front part 3 is compressed in the bore 10 of the cone 1 at the time of traction on the knob 5'.

Simultaneously with the displacement of the cone 1 in the direction of the arrow b, the screw 17 exerts a compressive action of the elastic unit 6 which, in reaction, transmits a pressure force on the faces 12 and 13 in contact, accentuating the mutual application force to which they are already subjected.

The gripping couple between the faces 12 and 13 is adjustable, as described previously, by means of the device In the embodiment according to FIG. 3, the mounting device is applied, contrary to the embodiment according to FIG. 1, at first against the face 13 of the spindle 2, by the face 12 of the front part 3, the cone 1 remaining free and no longer being applied against the wall of the cone 11 of the spindle 2. In addition, this embodiment permits disposing an always precise positioning of the V-shaped channel 19 of the flange 4 intended for gripping by means of a tool-changing arm, whether or not the mounting device is gripped in the spindle, such that the automatic changing is considerably improved.

Figure 4:
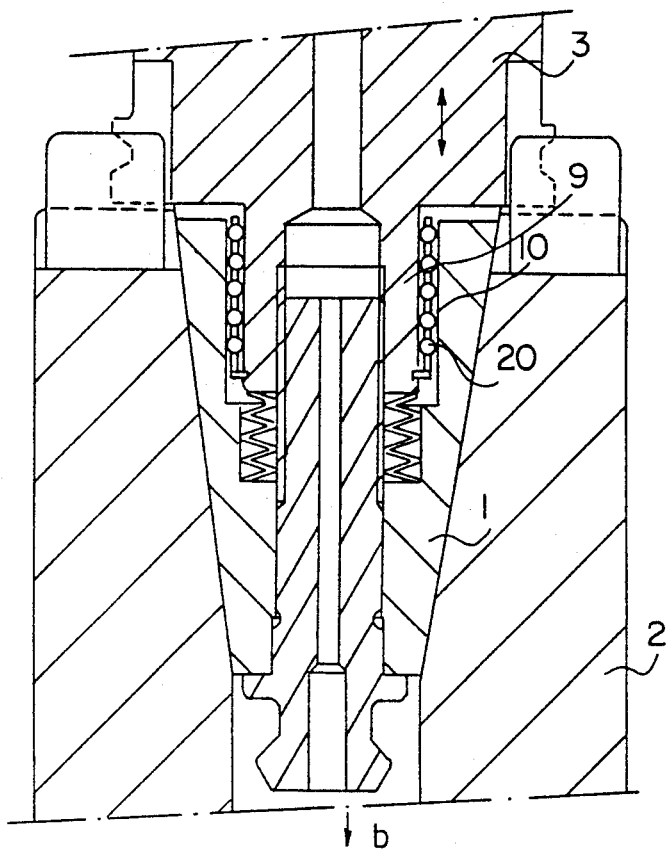
FIGS. 4 and 5 are views similar to those of FIGS. 1 and 3 of other embodiments of the invention.

FIG. 4 of the accompanying drawings shows another embodiment of the invention, in which the elastically deformable means 7 is constituted in the form of a cage of bearing balls 20 mounted with pre-stressing in the bore 10 of the cone 1 and on the shank 9 of the front part 3. This embodiment eliminates any adjusting tolerance between the shank 9 and the bore 10, such that the play is suppressed and the assembly of the elements is more precise, thus permitting a better functioning of the mounting.

According to another characteristic of the invention, the cone 1 may advantageously be provided on the depth of the bore 10 with at least one longitudinal slit, not shown, the cage of bearing balls 20 being disposed or realized, in a known manner, such that no ball enters into the slit or slits. Thanks to this embodiment, it is possible to obtain a supplementary pressure on the shank 9 of the front part 3, at the time of gripping of the mounting by means of the gripper of the machine, the cone 1 acting through the intermediary of the cage of bearing balls 20, in the same manner as in the embodiments according to FIGS. 1 to 3 and the rear face of the front part 3 being applied on the front face of the spindle 2.

Figure 5:
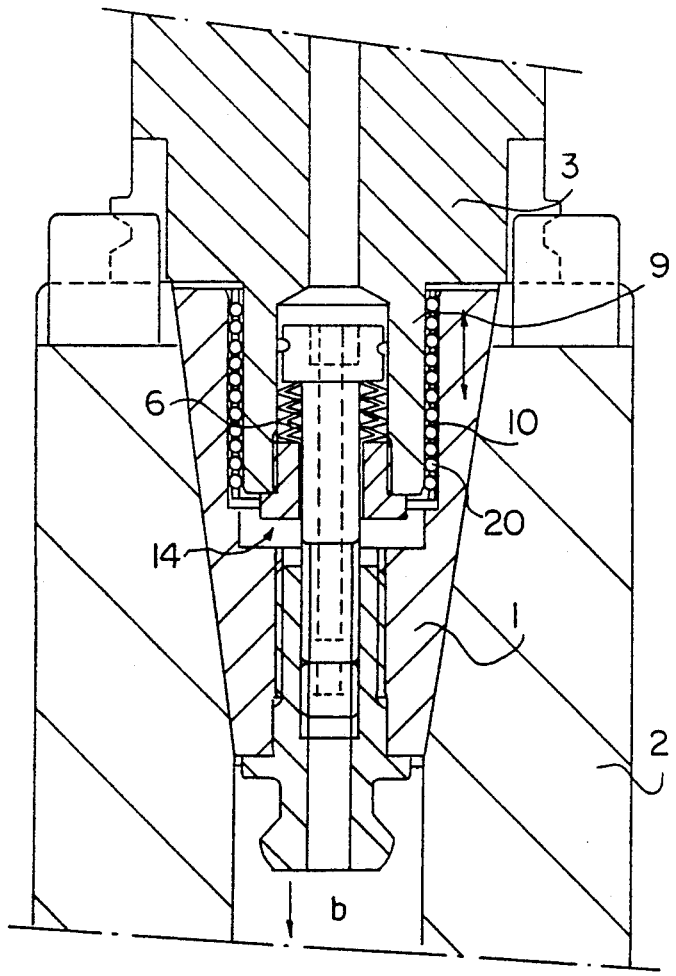

The embodiment according to FIG. 5 constitutes a variation of that according to FIG. 4. Specifically, the assembly without play between the shank 9 of the front part 3 and the cone 1 is effected, on the one hand, by means of a cage of bearing balls 20 housed in the cone 1 with pre-stressing, the said cone 1 being adapted to receive at least one longitudinal slit at the level of the bore 10 and, on the other hand, by means of an adjusting device 14 for the elastic unit 6. This device 14 has been described previously with respect to the embodiment according to FIG. 3.

Figure 6:
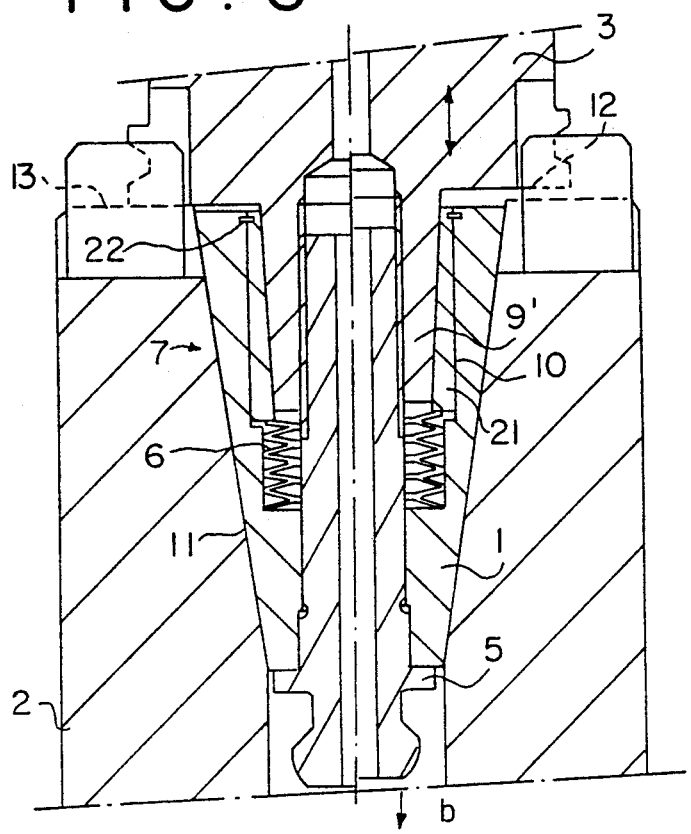
FIG. 6 shows, in two half views in side elevation and in section, another embodiment of the invention, in locking position and in unlocked position of the attachment.

FIG. 6 shows another embodiment of the invention with elimination of the machining tolerances and adjusting between the cone 1 and the front part 3. In this embodiment, the elastically deformable means 7 is constituted by a split conical sleeve 21, inserted between a conical shank 9' of the front part 3 and the bore 10 of the cone 1, being applied in the base of the bore 10 on the elastic pressure unit 6 and retained in the said bore 10, against the action of the unit 6, by an elastic ring 22, the assembly between the front part 3 and the cone 1 being effected by a knob 5.

The taper of the shank 9' is advantageously slight and, preferably, less than the 7/24ths cone, the large diameter of the cone being on the side of the back face 12 of the front part 3.

Figure 7:
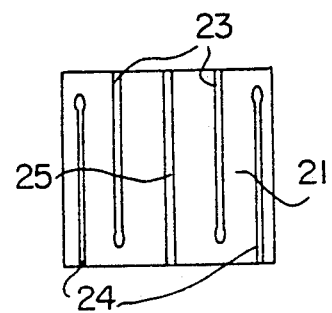
FIG. 7 is a view in side elevation of the gripping means employed, in the embodiment according to FIG. 6.

The split conical sleeve 21 (FIG. 7) is provided on its periphery, at regular intervals, with slits 23, 24 opening alternately on the upper and lower faces and a traversing slit 25.

Prior to mounting of the device and introduction of the front part 3 in the cone 1, the unit 6, in the form of a stack of Belleville washers, is positioned in a housing provided for this purpose at the base of the bore 10, whereupon the split conical sleeve 21 is introduced in the bore 10. This sleeve 21 is retained in the said bore 10 by means of the elastic ring 22 against the action of the unit 6 so that it is not ejected and remains applied against the said sleeve during mounting of the front part 3 in the cone 1 provided with the sleeve 21 and the fixation by means of the knob 5.

At the time of introduction of the cone 11 in the spindle 2 of the machine, the cone 1 is applied in this latter and the face 12 of the front part 3 remains spaced from the face 13 of the spindle 2. At the time of gripping, by means of the knob 5, actuated by the gripper of the machine, in the direction of the arrow b, the front part 3 advances in the direction of the face 13 of the spindle 2 and, simultaneously, the cone of the shank 9' which is in contact with that of the sleeve 21, drives this latter with sliding in the bore 10. At the same time as the face 12 comes into contact with a face 13 of the spindle 2, there is produced a gripping of the sleeve 21 between the bore 10 and the shank 9', arising from the pressure exerted on the sleeve 21 by the unit 6. This pressure has as an effect a stronger application of the cone 1 in the cone 11 of the spindle 2, through the intermediary of the knob 5 which simultaneously drives the front part 3 and the split conical sleeve 21.

Figure 8:
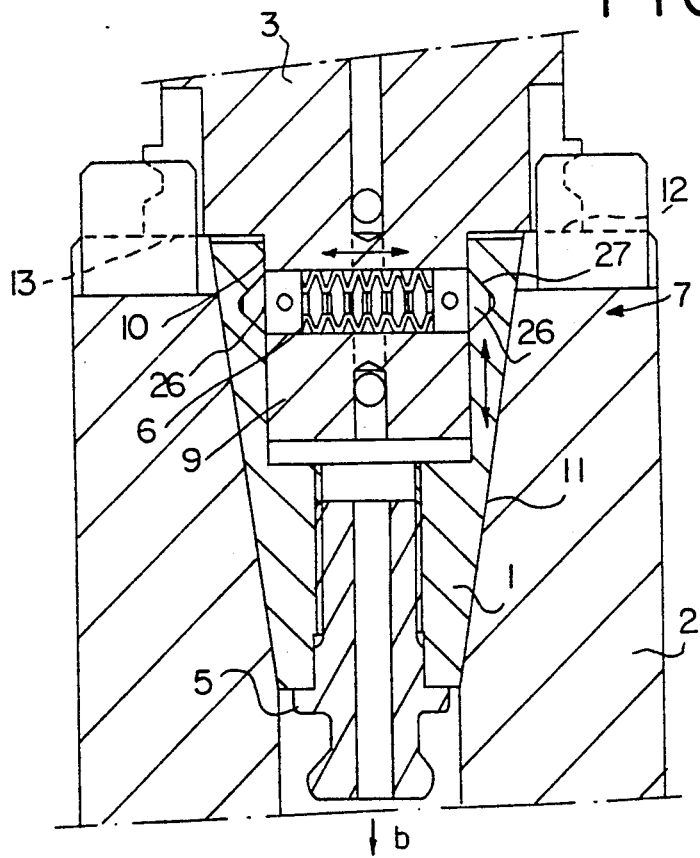
FIG. 8 is a view in side elevation and in section of another embodiment of the invention.
Figure 9:
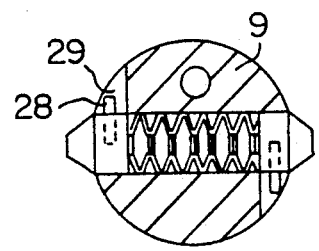
FIG. 9 is a view in transverse section of the gripping means employed in the embodiment according to FIG. 8, and FIGS. 10 to 16 are views in side elevation and in section of other embodiments of the invention.

In the embodiment according to FIGS. 8 and 9, the elastically deformable means is constituted by two elements 26 having the shape of points, bearing balls or the like, disposed in a housing extending diametrally in the shank 9 of the front part 3 and urged by the elastic unit 6, these elements 26 cooperating, in the assembled position of the front part 3 and the cone 1, with a housing 27 of corresponding or substantially corresponding section extending over all or part of the wall of the bore 10 of the cone 1 according to a circular generatrix, this housing 27 being connected to the upper face of the cone 1 through the intermediary of two longitudinal diametrally opposed openings for passage of the elements 26, offset with respect to the service position of the said elements 26, the knob 5 being simply screwed in the cone 1 and being applied on its rear face. This mounting of the means 7 is similar to a mounting of the bayonet type, which permits at the time of introduction of the mounting device in the spindle 2 of the machine to apply the faces 12 and 13 against one another.

So as to prevent an accidental departure of the elements 26 from their diametral housing in the shank 9, these latter are each provided with a catch 28 guided in a groove 29 of the shaft 9 (FIG. 9).

At the time of traction on the knob 5 in the direction of the arrow b, the cone 1 is displaced so as to be applied against the cone 11 of the spindle 2, thereby causing a displacement of the elements 26 in the direction of the longitudinal axis of the front part 3 against the action of the elastic unit 6, due to the force which is applied on them by the housing 27. The transmission of these various forces results in a stronger mutual contact of the faces 12 and 1, promoting their locking.

Figure 10:
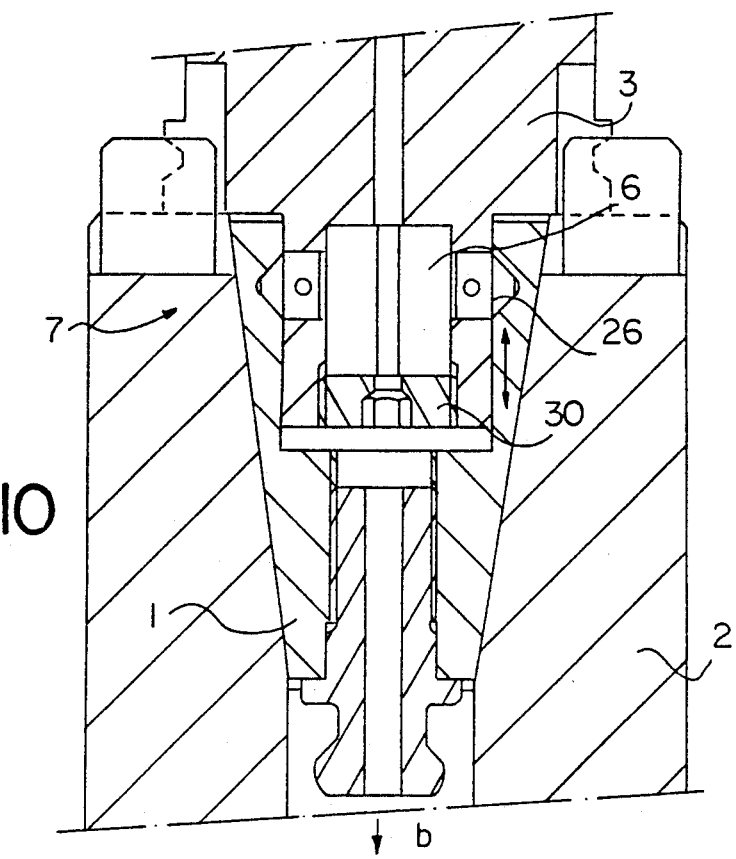

FIG. 10 shows another embodiment of the device according to FIG. 9, in which the elastic unit 6, on which are applied the elements 26 forming the means 7, is constituted by a compressible material such as rubber or the like, disposed in an axial housing of the shank 9 of the front part 3 and the compression of which is adjustable by means of a cover 30.

Figure 11:
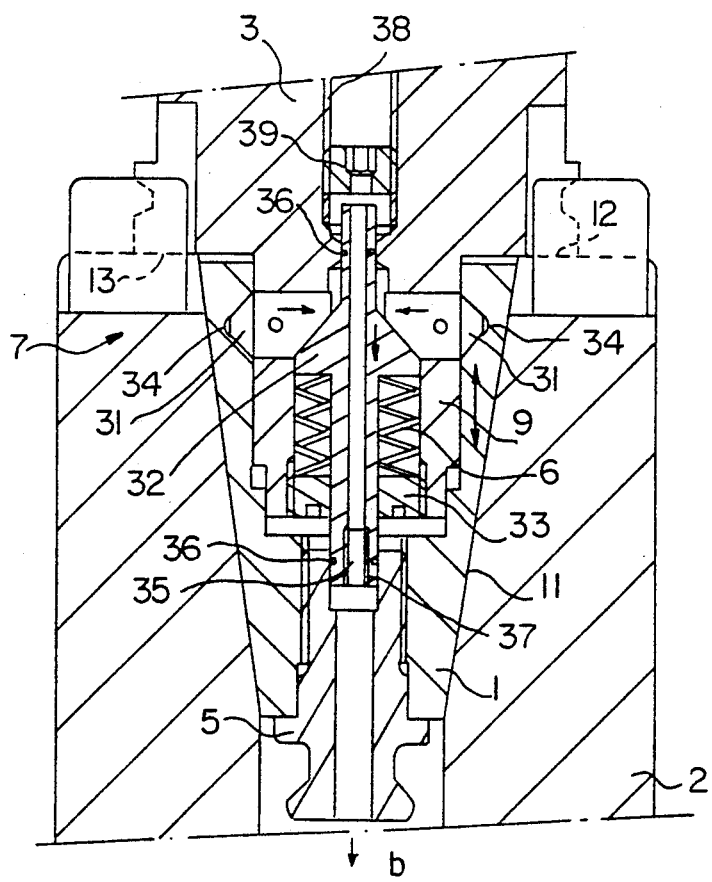

FIG. 11 shows another embodiment of the invention, in which the elastically deformable means 7 is constituted by several radially movable elements 31, uniformly distributed over the circumference of the shank 9, cooperating with a peripheral channel 34 and actuated by a frusto-conical central push rod 32 urged by the elastic pressure unit 6, the gripping pressure of which is adjusted by means of an internally threaded screw 33, the said push rod 32 being provided with a hollow axis 35 for guiding at its extremities in the front part 3 and in the knob 5 screwed in the back end of the cone 1, with interposition of toric sealing gaskets 36. These latter gaskets are intended to assure the fluid-tightness to the lubrication product passing if desired to the center of the spindle.

According to a characteristic of the invention, the hollow axis 35 of the push rod 32 is provided at its end guided in the knob 5, with a tapping 37, and the front part 3 is provided with an axial tapping 38, in which is mounted a screw 39 having a hexagonal socket. The tapping 37 is intended to effect a compression of the unit 6 by means of a screw introduced through the knob 5 and being applied on a mounting and unmounting device bearing on the face 12, so as to free the elements 32 from the groove 34 to permit the disassembly of the front part 3 from the cone 1 or its mounting in this latter. The compression of the unit 6 may also be effected by actuation of the screw 39 housed in the front part 3. The cone 1 is mounted in the spindle 2 without contact with the cone 11 of this latter, the walls 12 and 13 being in mutual contact, the movable elements 31 being positioned in the channel 34. Upon application of a force on the knob 5 by means of the gripper of the machine in the direction of the arrow b, the cone 1 is displaced and is applied against the wall of the cone 11 of the spindle 2. Simultaneously, the movable elements 31 are displaced radially in the direction of the push rod 32 and, through the intermediary of the cone of this latter, transmit a gripping force on the unit 6, which has the result of increasing the application force of the elements 31 in the channel 34 as well as increasing the mutual application force of the faces 12 and 13 causing their locking.

According to another characteristic of the invention, the movable elements 31 are advantageously urged by return springs (not shown) applying them against the push rod 32. Thus, a departure of the elements 31 from the shank 9 in mounting or unmounting position in the cone 1 could be prevented.

The embodiment according to FIG. 11 permits obtaining substantial gripping couples between the faces 12 and 13 as well as a uniform distribution of these forces on the said faces.

FIG. 12 shows a variation of the device according to FIG. 11, in which the movable elements 31, urged by return springs, not shown, are housed in a radially displaceable manner in the shank 9 of the front part 3 against the action of a frusto-conical push rod 32" bearing on the elastic unit 6, the pressure of which is adjustable by means of a screw 51 traversed by a hexagonal opening, the frusto-conical push rod 32" being adapted to be manipulated against the action of the unit 6, in the direction of a retraction of the elements 31, by means of a push screw 52 housed in the front part 3 and the rear face 12 of the front part 3 is provided with a locking device 53 for positioning the said front part 3 with respect to the cone 1.

The locking device 53 is constituted by a shaft or pin 54, which is mounted against the action of a return spring 55 in a corresponding housing of the front part 3 and maintained in this housing by means of an elastic ring, and which cooperates with a housing 56 (detail A), provided in the front face of the cone 1 and having an inclined slope 57 for releasing the pin 54 at the time of disassembly, a hole 58 being provided in addition, radially beneath the housing 56 (detail B).

Thanks to this embodiment, it is possible to lock the positioning of the front part 3 with respect to the cone 1 by orientation of the movable elements 31 being introduced in the corresponding housing or housings 34 of the cone 1 and, thus, of the channels 59 of the flange 4 with respect to the fingers 60 of the spindle 2. Disassembly is effected by a slight rotation of the front part 3 on the cone 1, the pin 54 thus disengaging from the housing 56 by sliding on the inclined slope 57, after a slight retraction effected by means of a pen point, a screwdriver or the like, introduced through the hole 58, this retraction being intended to cause the end of the pin 54 to pass onto the inclined slope 57.

This locking device is utilized above all at the time of introduction of the front part 3 in the cone 1 by a device of the bayonet type, such as described above.

According to a characteristic of the invention, the front part 3, the knob 5, the frusto-conical push rod 32", the elastic unit 6 and the push screw 52 are advantageously provided with an axial bore permitting access to the hexagonal opening of the screw 51. Thus, it is possible, the device being mounted, to adjust the gripping couple and the pressure of the unit 6 by means of the screw 51 by introducing a corresponding hex key through the bore of the knob 5. Such an adjustment is also possible by introduction of said key through the hole of the front part 3, the push screw 52, the frusto-conical push rod 32" and the unit 6.

The mounting and dismounting of the front part 3 into and out of the cone 1 is effected by screwing first the push screw 52 so as to exert a compressive force on the frusto-conical push rod 32" against the elastic unit 6, freeing the movable elements 31, which withdraw toward the central axis. In the case where a bayonet device is provided in the housing of the cone 1, it suffices to exert a lesser force by means of the push screw 51 on the frusto-conical push rod 32".

The device according to FIG. 12 is more particularly applicable in the case where a lubrication through the center of the spindle 2 is not necessary.

FIG. 13 shows another variation of the device according to FIG. 12, in which the movable elements 32, urged by return springs (not shown), are housed with the possibility of radial displacement in the shank 9 of the front part 3 against the action of a conical push rod 32', screwed at its end in the knob 5 and adapted to be locked in this latter by means of a screw 40, the said knob 5 being slidably mounted in the rear part of the cone 1, the shank 9 of the front part 3 being applied at the base of the bore 10 of the cone 1 on the elastic unit 6 and the said movable elements 31 traversing corresponding clearings of the cone 1 and cooperating with a circular channel 34' or circular housings provided in the spindle 2. This embodiment requires a machining of the spindle 2 of the machine to receive the ends of the movable elements 31.

According to a characteristic of the invention, the shank 9 of the front part 3 is advantageously stepped and has, at the level of the guiding of the movable elements 31, a portion of greater diameter 9'. Thus, guiding of the said movable elements 31 of the shank 9 is increased.

According to another characteristic of the invention, the end of the conical push rod 32' screwed in the knob 5, as well as the screw 40 are provided with a hexagonal socket intended to permit adjustment of the position of the push rod 32' with respect to the knob 5 and locking in position by means of a tool introduced through the central bore of the said knob 5.

Upon introduction of the mounting device in the spindle 2, the cone is in contact with the cone 11 of the said spindle 2 and there remains a minimal play considering the tolerances of the spindles and toolholders between the faces 12 and 13. Through the intermediary of the knob 5, the gripper of the machine drives the push rod 32' which exerts, via its conical portion, a couple and a pressure on the movable elements 31, which penetrate into the channel 34' or the like and, due to the cooperating shapes at this level, transmit this pressure to the front part 3, applying and mutually locking the faces 12 and 13. Displacement of the front part 3 creates a supplementary pressure on the elastic unit 6, which results in stronger application of the cone 1 in the cone 11 of the spindle 2.

Mounting in and dismounting from the spindle 2 of the machine are simple to perform because, when the gripper of the machine is released, the knob is applied on the rear face of the cone 1 and the conical portion of the push rod 32' frees the pressure on the movable elements 31 which thus retreat into their housing, permitting the departure of the spindle 2.

Figure 14:
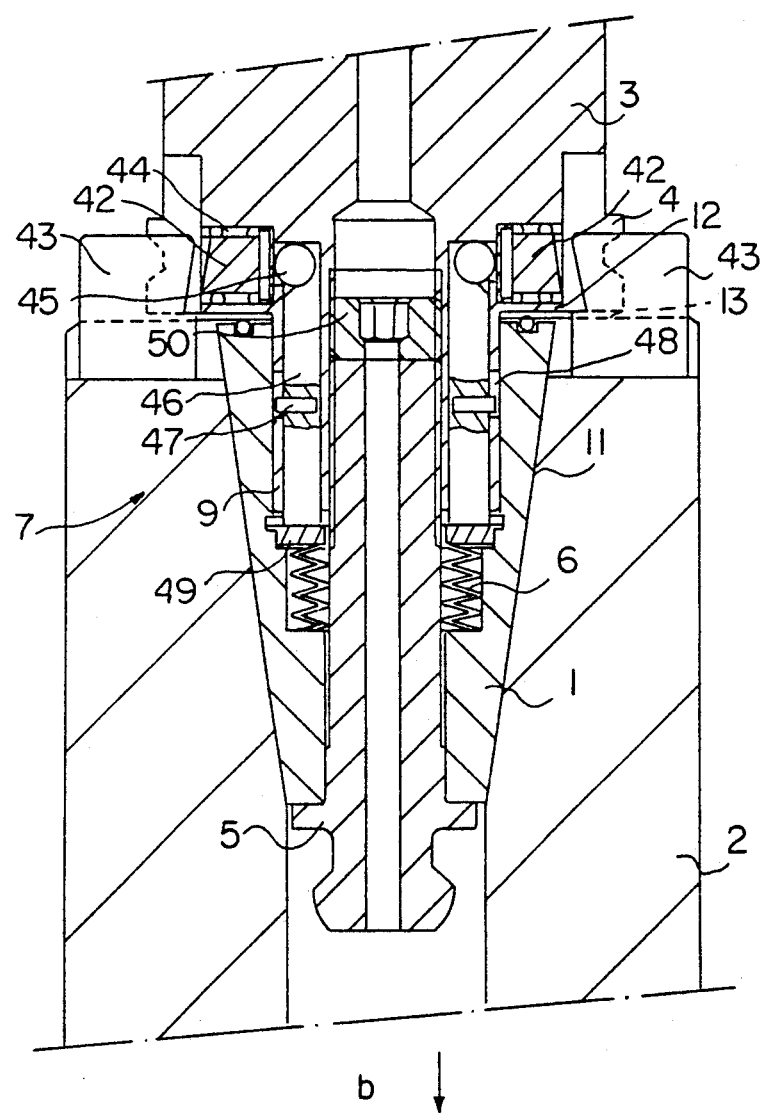

FIG. 14 of the accompanying drawing shows another embodiment of the invention, in which the elastically deformable means 7 applying the forward part 3 forcibly in the cone 1 in locking position, is advantageously realized in the form of an angle gear force transmission device constituted by wedge-shaped bolts 42 housed in openings of the flange 4 and cooperating in service position with correspondingly inclined faces of the drive tenons 43 of the spindle 2 of the machine, the said bolts 42 being urged to a rest position by springs 44, by bearing balls 45 bearing on the rear face of the bolts 42 and by push rods 46, having an inclined end for contacting the corresponding ball 45, guided in the shank 9 of the front part 3 by means of a pin 47 sliding in a corresponding groove 48 and bearing through the intermediary of a washer 49 on the elastic pressure unit, the assembly between the front part 3 and the cone 1 being effected by means of a knob 5 whose position is adjustable and may be locked by a screw 50.

In this embodiment the drive tenons 43 of the spindle 42 of the machine are used for the locking and the mutual application of the faces 12 and 13. The unit 6 is intended to take account of the possible eccentricities of the tenons in the machine spindles, as well as the large tolerances of these latter. Moreover, the unit 6 also provides the application couple of the bolts 42 and thus the locking and application couple of the cone 1 in the cone 11 of the spindle 2.

Application of the face 12 against the face 13 is effected thanks to the knob 5 by means of the gripper of the machine by displacement in the direction of the arrow b.

It will be understood that the bolts 42 could also have a different shape, namely round, conical or the like.

According to another characteristic of the invention, not shown in the accompanying drawings, the elastic unit 6 may advantageously be constituted in the form of a compressible block of rubber or other synthetic material, in the form of one or several springs, in the form of a hydraulic or pneumatic compression device or also in the form of a compressible powder.

Figure 15:
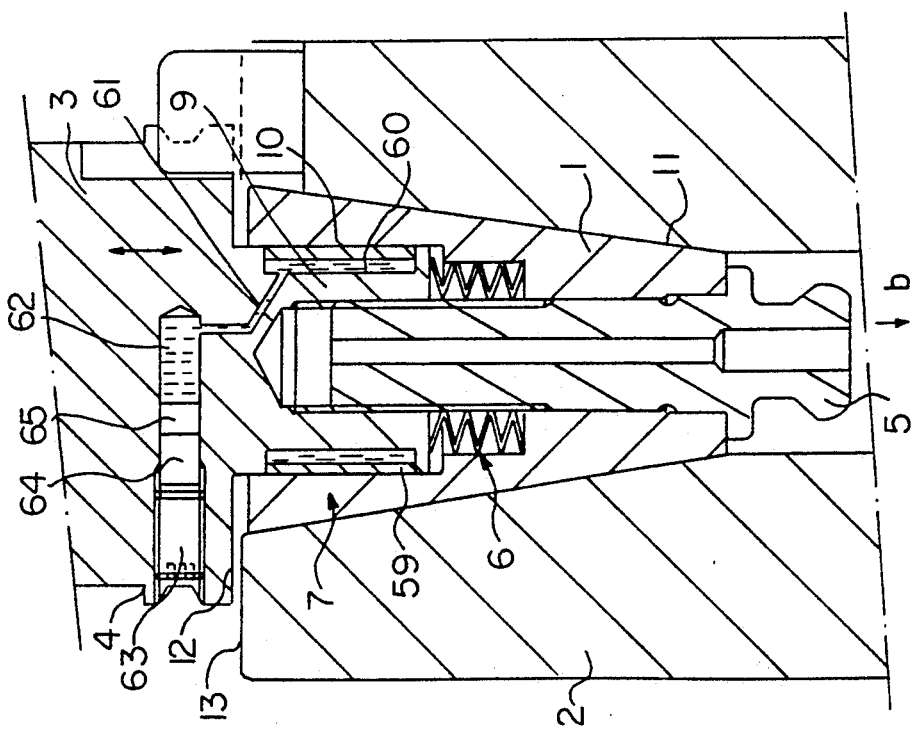

FIG. 15 of the accompanying drawings shows another embodiment of the invention, in which the elastically deformable means 7 applying the front part 3 forcibly in the cone 1, in locking position, is advantageously constituted in the form of an adjustable pressure hydraulic device comprising a deformable wall 59 at the level of the connection between the shank 9 of the front part 3 and the bore 10 of the cone 1.

The adjustable pressure hydraulic device forming the elastically deformable means 7 is advantageously constituted by a sealed annular chamber 60, delimited on the periphery of the shank 9 by the deformable wall 59 and connected by a channel 61 to a sealed chamber 62 in which is displaceably mounted against the action of an adjusting screw 63, a piston 64 provided with a sealing fitting 65.

The deformable wall 59 is preferably in the form of a thin collar seated at its ends on the ends of the annular chamber 60 or delimiting this chamber by interposition of sealing gaskets.

Upon introduction of the mounting device in the spindle 2 of the machine, the cone 1 is applied in the cone 11 of the spindle 2 and, upon displacement of the front part 3 effected by action of the gripper of the machine on the knob 5 and corresponding displacement in the direction of the arrow b, the face 12 of the front part 3 comes into contact with the face 13 of the spindle 2 of the machine. Simultaneously with this displacement of the front part 3, there is exerted a force on the cone 1 through the intermediary of the elastic pressure unit 6, formed by a stack of Belleville or by another elastic means, such that the said cone is beneficially applied against the cone 11 of the spindle 2. So as to eliminate any play between the shank 9 and the cone 1, the screw 63 is then actuated in the direction of a compression of the hydraulic liquid contained in the chamber 62 by the piston 64 provided with its sealing fitting 65. Such an actuation results in expelling the hydraulic liquid toward the annular chamber 60 and causing a deformation of the wall 59 resulting in a forcible application of this latter against the wall of the bore 10 of the cone and thus an extremely powerful gripping of the shank 9 in the said bore 10.

Figure 16:
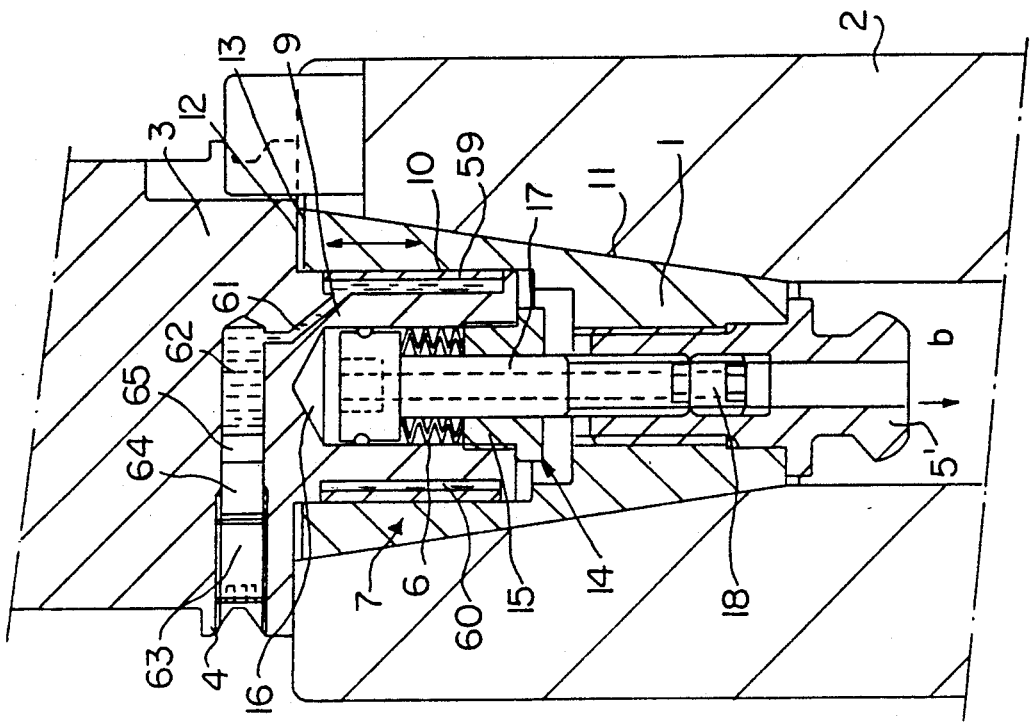

FIG. 16 of the accompanying drawings shows another embodiment of the invention, in which the elastic pressure unit 6 for the cone 1 in the spindle 2 in locking position is provided with an adjusting device 14 cooperating with a short knob 5' for assembly of the cone 1 and the front part 3, the said knob 5' being screwed in the cone 1 and locked against its rear face.

The adjusting device 14 is constituted by a screw 15 gripping the elastic unit 6, in a bore 16 of the shank 9 of the front part 3, against the end of a screw 17, provided at its two ends with a hexagonal socket, which cooperates with a tapping of the short knob 5', and by a set screw 18 bearing against the said screw 17 and also provided with a hexagonal socket, the screw 17 and the set screw 18 being adapted to receive, in addition, an axial bore for passage of lubricating fluid.

In this embodiment, the hydraulic device is shown in the same configuration as in the embodiment according to FIG. 15. Nevertheless, according to a characteristic of the invention, the actuation of the hydraulic device may also be effected by means of a piston connected to the screw 17 and compressing the hydraulic liquid in the chamber 62 at the end of its course, for gripping the cone 1 of the front part 3 in the cone 11 of the spindle 2. In this case, the piston 64 and the chamber 62 could advantageously be housed in the unit 6.

After introduction of the mounting device in the spindle 2 of the machine and mutual contact of the faces 12 and 13, the gripper of the machine exerts a force on the knob 5' in the direction of the arrow b. The cone 1 is thus driven and applied forcibly against the wall of the cone 11 of the spindle 2. In the course of this gripping, there is produced a displacement of the screw 17, entrained by the knob 5', and thus of the piston connected to the said screw 17, such that a compression of the hydraulic liquid in chamber 62 occurs, which pressurizes the liquid in the annular chamber 60 and deforms the wall 59 resulting in a gripping of the shank 9 in the bore 10.

According to an embodiment of the invention not shown in the accompanying drawings, the sealed annular chamber 60 may also be realized in the bore 10 of the cone 1, the deformable wall 59 delimiting this chamber 60 at the level of the contact with the shank 9 of the front part 3, pressurizing of the liquid contained in the chamber 60 being effected manually by means of a screw-actuated piston or cam means or automatically by means of a piston actuated by the knob 5 or 5' or by another actuating means housed in the cone 1 or in the part 3.

Pressurizing of the sealed annular chamber 60 results in a dilation or deformation of the wall 59 until the time of force-fitting of this latter against the wall of the bore 10 or the shank 9.

Thus, it is possible to effect an extremely efficient gripping of the shank 9 of the front part 3 and the bore 10 of the cone 1 of a mounting device with conical shank, by inflation and dilation of the material. In addition, the embodiment according to the invention permits obtaining a precision in concentricity tolerances of a very high quality.

The invention permits realizing a mounting device with conical shank permitting obtaining an increased rigidity of the assembly in service position and better withstanding the axial and radial forces exerted thereon.

It will be understood that the invention is not limited to the embodiments described and shown in the accompanying drawings. Modifications remain possible, especially from the point of view of the construction of the various elements or by substitution of equivalent techniques, without departing whatsoever from the scope of protection of the invention.

I claim:

1. Mounting device with conical shank, particularly a 7/24ths cone, for cone-to-surface use for attachments, tool carriers and tools, essentially constituted by a cone (1) for introduction in the spindle (2), by a front part (3) having a portion centered int he cone (1) and provided with a flange (4) for application against the face of the spindle (2), by a knob (5) connecting for assembly the cone (1) and the front part (3) and by an elastic pressure unit (6) of the cone (1) in the spindle (2) in locking position, mounted in compression between the said one (1) and the front part (3), characterized in that between the cone and said portion is provided an elastically deformable means (7) applying the front part (3) forcibly in the cone (1), in locking position.

2. Device according to claim 1, characterized in that the elastically deformable means (7) is advantageously present in the form of conical portions (8) delimited by slits (8') extending longitudinally and equally spaced over the circumference of the cone (1).

3. Device according to claim 2, characterized in that the slits (8') are advantageously filled by an elastically deformable compressible material.

4. Device according to claim 1, characterized in that the elastic pressure unit (6) of the cone (1) in the spindle (2) in locking position is provided by an adjusting device (14) cooperating with a short knob (5') for assembly of the cone (1) and the forward part (3), the said knob (5') being screwed in the cone (1) and blocked against its rear face.

5. Device according to claim 4, characterized in that the adjusting device (14) is constituted by a screw (15) gripping the elastic unit (6) in a bore (16) of the shank (9) of the front part (3), against the head of a screw (17), provided at its two ends with a hexagonal socket, which cooperates with a tapping in the short knob (5'), and by a set screw (18) bearing against the said screw (17) and also provided with a hexagonal socket, the screw (17) and the set screw (18) being adapted in addition to receive an axial bore for passage of lubricating fluid.

6. Device according to claim 5, characterized in that the set screw (18) may be replaced by an anti-loosening device provided in the threads of the tapping of the knob (5').

7. Device according to claim 1, characterized in that the elastically deformable means (7) is constituted in the form of a cage of bearing balls (20) mounted with pre-stressing in the bore (10) of the cone (1) and on the shank (9) of the front part (3).

8. Device according to claim 7, characterized in that the cone (1) is advantageously provided, on the periphery of the bore (10), with at least one longitudinal slit, the cage of bearing balls (20) being disposed or adapted, in a known manner, such that no ball enters into the slit or slits.

9. Device according to claim 7, characterized in that the assembly without play between the shank (9) of the front part (3) and the cone (1) is effected, on the one hand, by means of a cage of bearing balls (20) housed in the cone (1) with pre-stressing, the said cone (1) being provided with at least one longitudinal slit at the level of the bore (10) and, on the other hand, by means of a device (14) for adjusting the elastic unit (6).

10. Device according to claim 1, characterized in that the elastically deformable means (7) is constituted by a split conical sleeve (21), inserted between a conical shank (9') of the front part (3) and the bore (10) of the cone (1), being applied in the base of the bore (10) on the elastic pressure unit (6) and retained in the said bore (10) against the action of the unit (6) by an elastic ring (22), the assembly between the front part (3) and the cone (1) being effected by a knob (5).

11. Device according to claim 10, characterized in that the split conical sleeve (21) is provided on its periphery at regular intervals with slits (23, 24) opening alternately on the upper and lower faces and a traversing slit (25).

12. Device according to claim 1, characterized in that the elastically deformable means (7) is constituted by two elements (26) in the shape of points, balls or the like, disposed in a housing extending diametrally in the shank (9) of the front part (3) and urged by the elastic unit (6), these elements (26) cooperating in the assembled position of the front part (3) and the cone (1), with a housing (27) of corresponding or substantially corresponding section extending over all or part of the wall of the bore (10) of the cone (1) according to a circular generatrix, this housing (27) being connected to the upper face of the cone (1) through the intermediary of two longitudinal diametrally opposed openings for passage of the elements (26), offset with respect to the service position of the said elements (26), the knob (5) being simply screwed in the cone (1) and bearing on its rear face.

13. Device according to claim 12, characterized in that the elements (26) are each provided with a catch (28) guided in a groove (29) of the shank (9).

14. Device according to claim 12, characterized in that the elastic unit (6), on which bear the elements (26) forming the means (7), is constituted by a compressible material such as rubber or the like, disposed in an axial housing of the shank (9) of the front part (3) and the compression of which is adjustable by means of a cover (30).

15. Device according to claim 1, characterized in that the elastically deformable means (7) is constituted by several radially movable elements (31), uniformly distributed over the circumference of the shank (9), cooperating with a peripheral channel (34) and actuated by a central frusto-conical push rod (32) urged by the elastic pressure unit (6), the gripping pressure of which is adjustable by means of a screw (33), the said push rod (32) being provided with a hollow axis (35) for guiding at its extremities in the front part (3) and in the knob (5) screwed in the rear extremity of the cone (1), with interposition of toric sealing gaskets (36).

16. Device according to claim 15, characterized in that the hollow axis (35) of the push rod (32) is provided at its end guided in the knob (5) with a tapping (37), the front part (3) is provided with an axial tapping (38), in which is mounted a screw (39) having a hexagonal socket.

17. Device according to claim 15, characterized in that the movable elements (31) are advantageously urged by return springs applying them against the push rod (32).

18. Device according claim 15, characterized in that the movable elements (31), urged by return springs, are radially displaceably housed in the shank (9) of the front part (3) against the action of a conical push rod (32'), screwed at its extremity in the knob (5) and adapted to be locked in this latter by means of a screw (40), the said knob (5) being slidably mounted in the rear part of the cone (1), the shank (9) of the front part (3) being applied at the base of the bore (10) of the cone (1) on the elastic unit (6) and the said movable elements (31) traversing corresponding clearings of the cone (1) and cooperating with a circular channel (34') or circular housings provided in the spindle (2).

19. Device according to claim 18, characterized in that the shank (9) of the front part (3) is advantageously stepped and has at the level of the guiding of the movable elements (31), a portion of greater diameter (9').

20. Device according to claim 18, characterized in that the extremity of the conical push rod (32'), screwed in the knob (5), as well as the screw (40) are provided with a hexagonal socket intended to permit adjustment of the position of the push rod (32') with respect to the knob (5) and locking in position by means of a tool introduced through the central passage of the said knob (5).

21. Device according to claim 18, characterized in that the movable elements (31) urged by return springs, are radially displaceably received in the shank (9) of the front part (3) against the action of a frusto-conical push rod (32") bearing on the elastic unit (6), the pressure of which is adjustable by means of a screw (51) traversed by a hexagonal opening, the frusto-conical push rod (32") being movable against the action of the unit (6), in the direction of a retraction of the elements (31), by means of a push screw (52) housed in the front part (3) and the rear face (12) of the front part (3) is provided with a device (53) for locking in position the said front part (3) with respect to the cone (1).

22. Device according to claim 21, characterized in that the locking device (53) is constituted by a shaft or pin (54), which is mounted against the action of a return spring (55) in a corresponding housing of the front part (3) and maintained in this housing by means of an elastic sleeve, and which cooperates with a housing (56), provided in the forward face of the cone (1) and having an inclined slope (57) for disengagement of the pin (54) at the time of dismounting, a hole (58) being moreover provided radially beneath the housing (56).

23. Device according to claim 21, characterized in that the front part (3), the knob (5), the frusto-conical push rod (32"), the elastic unit (6) and the push screw (52) are advantageously provided with an axial opening permitting access to the hexagonal socket of the screw (51).

24. Device according to claim 1, characterized in that the elastically deformable means (7) applying the front part (3) forcibly in the cone (1), in locking position is advantageously realized in the form of an angle gear force transmission device constituted by wedge-shaped bolts (42) housed in clearings of the flange (4) and cooperating in service position with correspondingly inclined faces of the drive tenons (43) of the spindle (2) of the machine, the said bolts (42) being returned to rest position by springs (44), by bearing balls (45) bearing on the rear face of the bolts (42) and by push rods (46), having an inclined extremity bearing on the corresponding ball (45), guided in the shank (9) of the front part (3) by means of a pin (47) sliding in a corresponding groove 48 and being applied through the intermediary of a washer (49) on the elastic pressure unit (6), the assembly between the front part (3) and the cone (1) being effected by means of a knob (5) the position of which is adjustable and may be locked by a screw (50).

25. Device according to claim 1, characterized in that the elastic unit (6) may advantageously be constituted in the form of a compressible block of rubber or other synthetic material, in the form of one or several springs, in the form of a hydraulic or pneumatic compression device or also in the form of a compressible powder.

26. Device according to claim 1, characterized in that the elastically deformable means (7) applying the front part (3) forcibly in the cone (1), in locking position, is advantageously constituted in the form of an adjustable pressure hydraulic device comprising a deformable wall (59) at the level of the connection between the shank (9) of the front part (3) and the bore (10) of the cone (1).

27. Device according to claim 26, characterized in that the adjustable pressure hydraulic device forming the elastically deformable means (7) is advantageously constituted by a sealed annular chamber (60) delimited on the periphery of the shank (9) by a deformable wall (59) and connected by a channel (61) to a sealed chamber (62) in which is displaceably mounted against the action of an adjusting screw (63), a piston provided with a sealing fitting (65).

28. Device according to claim 27, characterized in that the deformable wall (59) is preferably in the form of a thin sleeve seated at its extremities on the ends of the annular chamber (60) or delimiting this chamber by interposition of sealing gaskets.

29. Device according to claim 27, characterized in that actuation of the hydraulic device is effected by means of a piston connected to the screw (17) and compressing the hydraulic liquid in the chamber (62) at the end of its travel for gripping of the cone (1) of the front part (3) in the cone (11) of the spindle (2), the piston (64) and the chamber (62) being advantageously housed in the unit (6).

30. Device according to claim 27, characterized in that the sealed annular chamber (60) is realized in the bore (10) of the cone (1), the deformable wall (59) delimiting this chamber (60) at the level of the contact with the shank (9) of the front part (3), pressurization of the liquid contained in the chamber (60) being effected manually by means of a piston actuated by screw or by cam, or automatically by means of a piston actuated by the knob, or by another actuating means housed in the cone (1) or in the part (3).

* * * * *